US010674871B2

(12) United States Patent
Wong (10) Patent No.: US 10,674,871 B2
(45) Date of Patent: Jun. 9, 2020

(54) FOOD PROCESSING DEVICE

(71) Applicant: KING'S FLAIR MARKETING LIMITED, Tortola (VG)

(72) Inventor: Siu Wah Wong, Hong Kong (HK)

(73) Assignee: KING'S FLAIR MARKETING LIMITED, Tortola (VG)

( * ) Notice: Subject to any disclaimer, the term of this patent is extended or adjusted under 35 U.S.C. 154(b) by 153 days.

(21) Appl. No.: 15/389,727

(22) Filed: Dec. 23, 2016

(65) Prior Publication Data
US 2017/0181580 A1    Jun. 29, 2017

(30) Foreign Application Priority Data
Dec. 24, 2015    (CN) .......................... 2015 1 0988201

(51) Int. Cl.
A47J 43/04    (2006.01)
A47J 19/06    (2006.01)
A47J 19/02    (2006.01)

(52) U.S. Cl.
CPC .............. *A47J 43/04* (2013.01); *A47J 19/023* (2018.08); *A47J 19/06* (2013.01)

(58) Field of Classification Search
CPC ........... A47J 43/04; A47J 19/06; A47J 19/023
USPC .......................................................... 99/495
See application file for complete search history.

(56) References Cited

U.S. PATENT DOCUMENTS

| | | | | |
|---|---|---|---|---|
| 3,774,490 A | * | 11/1973 | Gerson | B26D 1/553 83/425.3 |
| 4,069,752 A | * | 1/1978 | Ahner | A47J 19/06 100/112 |
| 4,095,339 A | * | 6/1978 | Turner | B26B 27/002 30/114 |
| 4,348,950 A | * | 9/1982 | Harris | A47J 19/06 100/116 |
| 4,466,346 A | * | 8/1984 | Gemelli | A47J 19/06 100/112 |
| 4,531,457 A | * | 7/1985 | Sivaslian | A47J 19/022 100/234 |
| 4,537,123 A | * | 8/1985 | Holcomb | A47J 19/06 100/125 |
| 4,545,299 A | * | 10/1985 | Ahner | A47J 19/06 100/112 |
| 4,573,244 A | * | 3/1986 | Holcomb | A47J 42/34 241/169 |
| 4,582,265 A | * | 4/1986 | Petronelli | A47J 19/06 100/234 |
| 4,697,749 A | * | 10/1987 | Holcomb | A47J 42/34 241/169 |

(Continued)

*Primary Examiner* — Eric S Stapleton
(74) *Attorney, Agent, or Firm* — Nyemaster Goode P.C.

(57) ABSTRACT

The present invention relates to a food processing device, comprising a base plate provided with a first pivot and a second pivot, a processing element provided on the base plate, and an arm assembly pivotably coupled to the base plate. The arm assembly comprises a first arm and a second arm pivotally coupled to each other, each of the two arms being pivotally coupled to the base plate, whereby the first arm and the second arm form together a compound lever mechanism. A force applied by an operator onto the second arm increases as an output by the second arm, and the increasing force is conveyed to the first arm so that the food processing device is operated faster and easier, without making the operator more fatigued.

18 Claims, 10 Drawing Sheets

(56) References Cited

U.S. PATENT DOCUMENTS

| | | | | |
|---|---|---|---|---|
| 4,714,205 A * | 12/1987 | Steinko | A47J 19/06 | 241/169.2 |
| 4,794,854 A * | 1/1989 | Swaim | A47J 19/06 | 100/112 |
| 4,852,256 A * | 8/1989 | Schoettler | B26B 3/04 | 30/114 |
| 5,082,190 A * | 1/1992 | Chen | A47J 42/08 | 241/169.1 |
| 5,101,720 A * | 4/1992 | Bianchi | A47J 19/06 | 100/112 |
| 5,148,995 A * | 9/1992 | Hurst | A61J 7/0007 | 241/169.1 |
| 5,163,362 A * | 11/1992 | Gaber | A47J 19/005 | 100/112 |
| 5,165,335 A * | 11/1992 | Bianchi | A47J 19/06 | 100/112 |
| 5,245,902 A * | 9/1993 | Pereira | B26D 3/185 | 83/425.3 |
| 5,263,408 A * | 11/1993 | Blanchet | B30B 9/04 | 100/125 |
| 5,370,044 A * | 12/1994 | Lackie | A47J 19/06 | 100/125 |
| 5,463,941 A * | 11/1995 | Gibson | A47J 19/06 | 100/112 |
| 5,467,699 A * | 11/1995 | Laib | A47J 19/06 | 100/112 |
| 5,513,562 A * | 5/1996 | Moor | A47J 19/06 | 100/112 |
| 5,520,104 A * | 5/1996 | Ancona | A47J 19/06 | 100/112 |
| 5,520,105 A * | 5/1996 | Healy | B26D 3/26 | 100/103 |
| 5,531,389 A * | 7/1996 | Husted | A47J 42/04 | 241/169.1 |
| 5,590,590 A * | 1/1997 | Zammit | A47J 43/286 | 100/110 |
| 5,651,506 A * | 7/1997 | Hockey | A47G 19/24 | 222/142.1 |
| 5,660,341 A * | 8/1997 | Perkins | A47J 43/255 | 241/169.1 |
| 5,685,501 A * | 11/1997 | Wagner | A47J 42/36 | 241/168 |
| 5,692,424 A * | 12/1997 | Wallace | A47J 36/00 | 83/167 |
| 5,730,374 A * | 3/1998 | Wu | A47J 42/34 | 241/169 |
| 5,791,237 A * | 8/1998 | Gibson | A47J 19/06 | 100/112 |
| 5,863,001 A * | 1/1999 | Schulze | A61J 7/0007 | 241/169 |
| 5,988,543 A * | 11/1999 | Wu | A47J 42/34 | 241/168 |
| 6,109,170 A * | 8/2000 | Short | B30B 9/04 | 100/112 |
| 6,196,122 B1 * | 3/2001 | Lai | A47J 19/022 | 100/110 |
| 6,209,439 B1 * | 4/2001 | Repac | B26D 3/18 | 241/169.2 |
| 6,234,074 B1 * | 5/2001 | Mangum | A47J 43/286 | 100/110 |
| 6,293,445 B1 * | 9/2001 | Miller | A45F 3/00 | 224/236 |
| 6,382,090 B1 * | 5/2002 | Kokkinos | A47J 19/06 | 100/112 |
| 6,453,560 B1 * | 9/2002 | Silver | B26B 13/00 | 30/134 |
| 6,505,548 B1 * | 1/2003 | Lillelund | A47J 19/06 | 100/112 |
| 6,543,344 B1 * | 4/2003 | Settele | A47J 19/06 | 100/110 |
| 6,568,616 B1 * | 5/2003 | Tang | A47J 42/34 | 241/168 |
| 6,616,076 B2 * | 9/2003 | Wong | A47J 42/34 | 241/168 |
| 6,672,524 B1 * | 1/2004 | Holcomb | A47J 42/34 | 241/168 |
| 6,805,031 B1 * | 10/2004 | Stallato | B26B 29/063 | 83/452 |
| 6,871,808 B2 * | 3/2005 | Holcomb | A47J 42/46 | 241/169.1 |
| 6,966,256 B2 * | 11/2005 | Canizares | A47J 19/06 | 100/126 |
| 6,974,098 B2 * | 12/2005 | Keller | A47J 19/06 | 100/112 |
| 7,000,535 B2 * | 2/2006 | Harrison-Griffin | A47J 19/06 | 100/126 |
| 7,080,455 B1 * | 7/2006 | Ronan | B26B 1/02 | 30/122 |
| 7,117,785 B2 * | 10/2006 | Walker, III | A47J 19/06 | 100/126 |
| 7,210,643 B2 * | 5/2007 | Holcomb | A47J 42/34 | 241/169 |
| 7,296,762 B2 * | 11/2007 | Dorion | A47J 19/06 | 241/169 |
| 7,302,887 B1 * | 12/2007 | Chapman | A47J 19/06 | 100/116 |
| 7,395,753 B2 * | 7/2008 | Dorion | A47J 19/06 | 100/110 |
| 7,591,439 B2 * | 9/2009 | Tang | A47J 42/46 | 241/169.1 |
| 7,648,092 B2 * | 1/2010 | Wong | A47J 43/25 | 100/234 |
| 7,648,094 B2 * | 1/2010 | Robbins | A47J 42/34 | 241/169 |
| 7,708,220 B1 * | 5/2010 | Tang | A47J 42/46 | 241/169.1 |
| 7,828,237 B2 * | 11/2010 | Griffith | A47J 42/34 | 241/169 |
| 8,322,277 B2 * | 12/2012 | Griffith | A47J 19/005 | 100/110 |
| 8,459,160 B2 * | 6/2013 | Holcomb | B26D 1/553 | 83/425.3 |
| 8,991,291 B2 * | 3/2015 | Holcomb | B26D 1/553 | 30/279.2 |
| 9,125,525 B2 * | 9/2015 | Wade | A47J 42/18 | |
| 9,174,352 B2 * | 11/2015 | Repac | B26D 3/185 | |
| 9,237,822 B2 * | 1/2016 | Peronti | A47J 19/022 | |
| 9,326,631 B2 * | 5/2016 | Shen | A47J 19/022 | |
| 2001/0047726 A1 | 12/2001 | Zarlengo | A47J 19/005 | 100/132 |
| 2002/0002913 A1 * | 1/2002 | Mariller | A47J 31/3633 | 99/495 |
| 2002/0069769 A1 * | 6/2002 | Herren | A47J 19/06 | 100/125 |
| 2003/0047088 A1 * | 3/2003 | Pardey | A47J 19/06 | 100/234 |
| 2003/0222162 A1 * | 12/2003 | Klamer | A47J 19/06 | 241/95 |
| 2004/0055437 A1 * | 3/2004 | Engdahl | B26D 1/553 | 83/597 |
| 2004/0134362 A1 * | 7/2004 | Harrison-Griffin | A47J 19/06 | 100/234 |
| 2004/0164192 A1 * | 8/2004 | Chang | B02C 18/0007 | 241/100 |
| 2005/0103214 A1 * | 5/2005 | Squires | A47J 43/286 | 99/495 |
| 2005/0263016 A1 * | 12/2005 | Walker, III | A47J 19/06 | 100/125 |
| 2006/0086265 A1 * | 4/2006 | Gonzalez | A47J 19/022 | 100/234 |
| 2006/0090352 A1 * | 5/2006 | Kaposi | B26B 5/008 | 30/299 |
| 2006/0191422 A1 * | 8/2006 | Dorion | A47J 19/06 | 99/349 |
| 2006/0192042 A1 * | 8/2006 | So | A47J 19/005 | 241/95 |
| 2006/0218799 A1 * | 10/2006 | Kaposi | B26B 5/008 | 30/302 |

(56) References Cited

U.S. PATENT DOCUMENTS

| | | | | |
|---|---|---|---|---|
| 2006/0289687 A1* | 12/2006 | So | ............................ | A47J 19/04 |
| | | | | 241/169.2 |
| 2007/0028785 A1* | 2/2007 | Foster | ....................... | B26D 3/26 |
| | | | | 99/537 |
| 2007/0215729 A1* | 9/2007 | Wong | ....................... | A47J 43/25 |
| | | | | 241/94 |
| 2009/0078100 A1* | 3/2009 | Repac | .................... | B26D 1/553 |
| | | | | 83/425.3 |
| 2009/0120301 A1* | 5/2009 | Severnak | ............... | A47J 43/044 |
| | | | | 99/331 |
| 2010/0147163 A1* | 6/2010 | Holcomb | ................. | A47J 43/07 |
| | | | | 99/537 |
| 2010/0147982 A1* | 6/2010 | Tang | ........................ | A47J 42/26 |
| | | | | 241/36 |
| 2010/0229736 A1* | 9/2010 | Griffith | ................. | A47J 19/005 |
| | | | | 100/125 |
| 2011/0192036 A1* | 8/2011 | Holcomb | ................... | B26B 3/04 |
| | | | | 30/279.2 |
| 2012/0017731 A1* | 1/2012 | Mastroianni | .............. | B26D 1/03 |
| | | | | 83/13 |
| 2012/0103152 A1* | 5/2012 | Roes | ........................ | A47J 19/06 |
| | | | | 83/23 |
| 2013/0160213 A1* | 6/2013 | Salles | ..................... | A47J 43/27 |
| | | | | 7/119 |
| 2015/0257571 A1* | 9/2015 | Shen | ..................... | A47J 19/022 |
| | | | | 100/125 |

* cited by examiner

FOOD PROCESSING DEVICE

TECHNICAL FIELD OF THE INVENTION

This invention relates to a food preparation device, and particularly, to a hand tool for processing food items, which has an arm assembly having a lever mechanism to allow for faster and easier operation of the hand tool without making the operator fatigued.

BACKGROUND OF THE INVENTION

In our daily life, preparation of food items always requires processing of the food items. One type of simple processing tools is a manually-operated food processing device, such as a garlic press, a slitter for slitting onions or mushrooms, a chopper for chopping onions or mushrooms, a fruit and vegetables juice extractor, etc. This type of manual food processing device typically comprises a base plate and an arm that are pivotally coupled to each other, with the base plate provided with a squeeze chamber, for example, and the arm provided with a squeezer. Taking the garlic press as an example, when the arm is pressed downward and pushed toward the squeeze chamber on the base plate, garlic cloves placed in the squeeze chamber would be squeezed and discharged from through holes formed on the bottom of the squeeze chamber as garlic puree. Like the garlic press, a fruit and vegetable juice extractor squeezes fruits and vegetables with an arm being pressed downward in order to achieve juice extraction. However, this type of hand tools currently available usually requires application of a substantial force onto the arm in the operation thereof, making the operation effort-demanding.

Therefore, there is a need for a hand-operated food processing device that is operated faster and easier, without making the operator more fatigued.

SUMMARY OF THE INVENTION

An object of the present invention is to provide an improved food processing device that is operated manually. The food processing device has an arm assembly configured to have a compound lever mechanism through which an input force applied to the arm assembly increases. The increasing force is transmitted to a squeezer arranged on the arm assembly and acting on food items to be processed, making the operation very labor-saving and time-saving.

The food processing device of the present invention comprises a food processing device. The food processing device comprises a base plate comprising a first pivot and a second pivot that are in spaced apart fashion along a length direction of the base plate; a processing element arranged on the base plate for processing food items; and an arm assembly pivotably coupled to the base plate. The arm assembly comprises a first arm and a second arm.

The first arm comprises a proximal end portion and a distal end portion, the proximal end portion configured to be pivotally coupled to the base plate by the first pivot to allow pivotal movement of the first arm between a closed position in proximity to the base plate and an open position away from the base plate; wherein the first arm further comprises a squeezer configured to act on the food items that are placed on the processing element to be processed when the first arm is in the closed position, thereby pressing the food items against the processing element.

The second arm is pivotally coupled to the distal end portion of the first arm, the second arm comprising a manipulation portion, two opposite bifurcated portions extending from the manipulation portion, and a slot formed through each of the bifurcated portions; wherein the second pivot of the base plate is arranged to pass through the slots on the two bifurcated portions in such a way that allows for slidable movement of the two bifurcated portions within the slots in a longitudinal direction of the slots, which slidable movement in turn causes the first arm to pivot between the closed position and the open position, throughout a pivotal movement process of the second arm about the second pivot relative to the base plate.

Preferably, the slots formed on the respective bifurcated portions are positioned to be away from the manipulation portion. According to the present invention, a distance between the second pivot and the manipulation portion increases along with the pivotal movement of the second arm from a position in proximity to the base plate to a position away from the base plate. The second arm is able to pivot relative to the base plate by an angle of at least 90 degrees. In certain cases, the second pivot is configured to comprise two pivot branches each arranged on a lateral side of the base plate and extending through the respective slot.

In an embodiment of the present invention, the food processing device is provided as a garlic press in which the processing element is configured to be a squeeze chamber for accommodating garlic cloves, and the squeezer is positioned and configured as a press plate engageable with the squeeze chamber. The squeeze chamber may have a bottom provided with a plurality of through holes allowing for outflow of garlic granules and a fluid, or with a plurality of blades arranged in parallel for slicing the garlic cloves.

In another embodiment of the present invention, the food processing device is provided as a food cutting device in which the processing element is configured to be a cutting plate having a plurality of blades and fixed on a top face of the base plate, and the squeezer is configured as a plurality of protrusions extending from the first arm and positioned to cooperate with the plurality of blades on the cutting plate to cut the food items. The plurality of blades on the cutting plate are arranged to form a blade grille which may be composed of two groups of blades arranged relative to each other at a right angle to form a square grille, or may be composed of blades parallel to each other to form a slit grille.

Preferably, the cutting plate is detachably mounted on the base plate for ease of change of different cutting plates to adapt for different cutting requirements for different food items. More preferably, the food cutting device further comprises a container detachably engageable with a periphery of a bottom face of the base plate for receiving the food items discharged from the cutting plate.

The food cutting device may be selected from a group consisting of an onion chopper, an onion slitter, a mushroom chopper, a mushroom slitter and a potato slitter.

In yet another embodiment of the present invention, the food processing device is provided as a juice extractor in which the processing element is configured to be a squeeze chamber for accommodating fruits and vegetables and to comprise a concave squeeze face allowing for outflow of a fluid, and the squeezer is configured to be a convex squeeze face having a plurality of teeth and positioned to cooperate with the concave squeeze face for juice extraction. The concave squeeze face has a plurality of guiding holes allowing for the outflow of the fluid. Preferably, the juice extractor further comprises a container detachably engageable with a periphery of a bottom face of the base plate for receiving juice of the fruits and vegetables.

In comparison with the prior art food processing devices, the device of present invention is characterized by the arm assembly which comprises the first arm and the second arm that are pivotally coupled to each other, wherein the first and second arms are also pivotally coupled to the base plate, respectively, to form two levers, in such a way that the first arm and the second arm together form a compound lever mechanism. If an operator applies a force to the manipulation portion of the second arm (i.e. the first lever), the second arm would output an increasing force which immediately serves as an input force applied by the second lever onto the first arm (i.e. the second lever), and the increasing force applied on the first arm would then be transmitted to the squeezer arranged on the arm assembly and acting on the food items, i.e. the force acting on the food items increases accordingly. In this way, the food processing device of the invention is operated faster and with an ease.

DETAILED DESCRIPTION OF THE INVENTION

FIG. 1, FIG. 2 and FIG. 3A to FIG. 3C show in a schematic manner a garlic press 10 constructed according to a first embodiment of the present invention. The garlic press 10 comprises a base plate 12, an arm assembly 14 and a squeeze chamber 16. The base plate 12 comprises a pivot end 121 and a handle end 122. The squeeze chamber 16 is provided at a position in proximity to the pivot end 121 of the base plate 12, and is shaped or sized to accommodate garlic cloves or the like to be processed. The squeeze chamber 16 has a bottom provided with a plurality of through holes allowing for outflow of garlic granules and a fluid. Optionally, the bottom of the squeeze chamber may be provided with a plurality of parallel blades for slicing garlic cloves or the like to satisfy various food processing needs.

Figure 1:
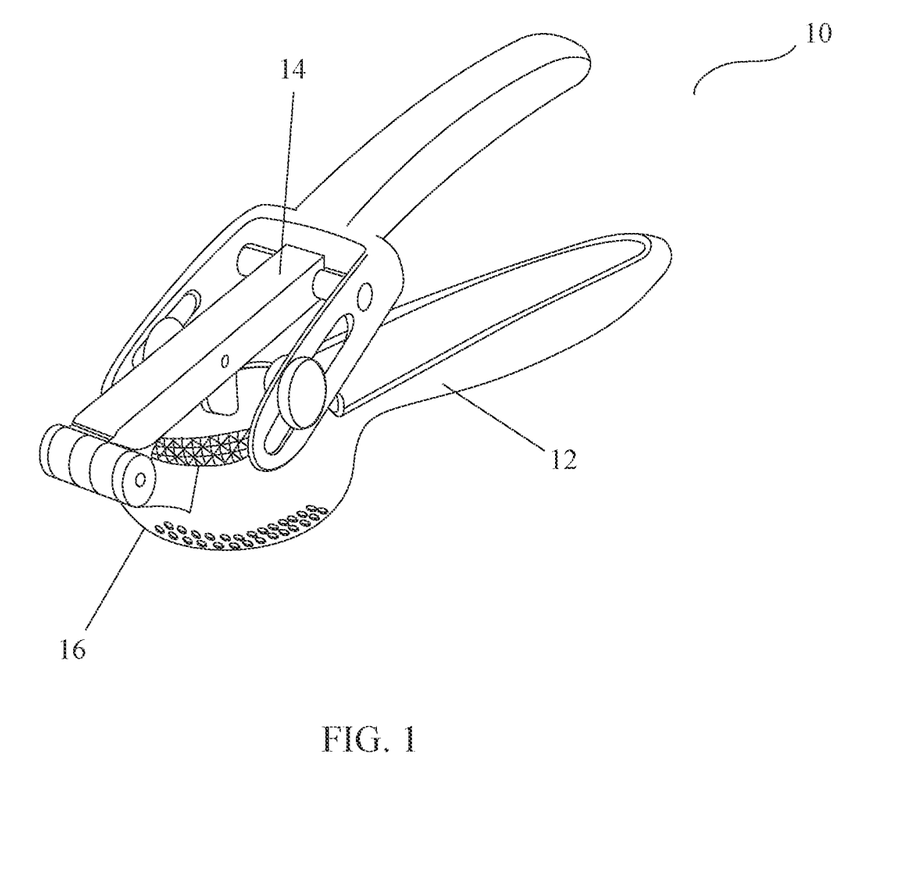
FIG. 1 is a schematic perspective view of a structure of a garlic press constructed according to a first embodiment of the present invention.
Figure 2:
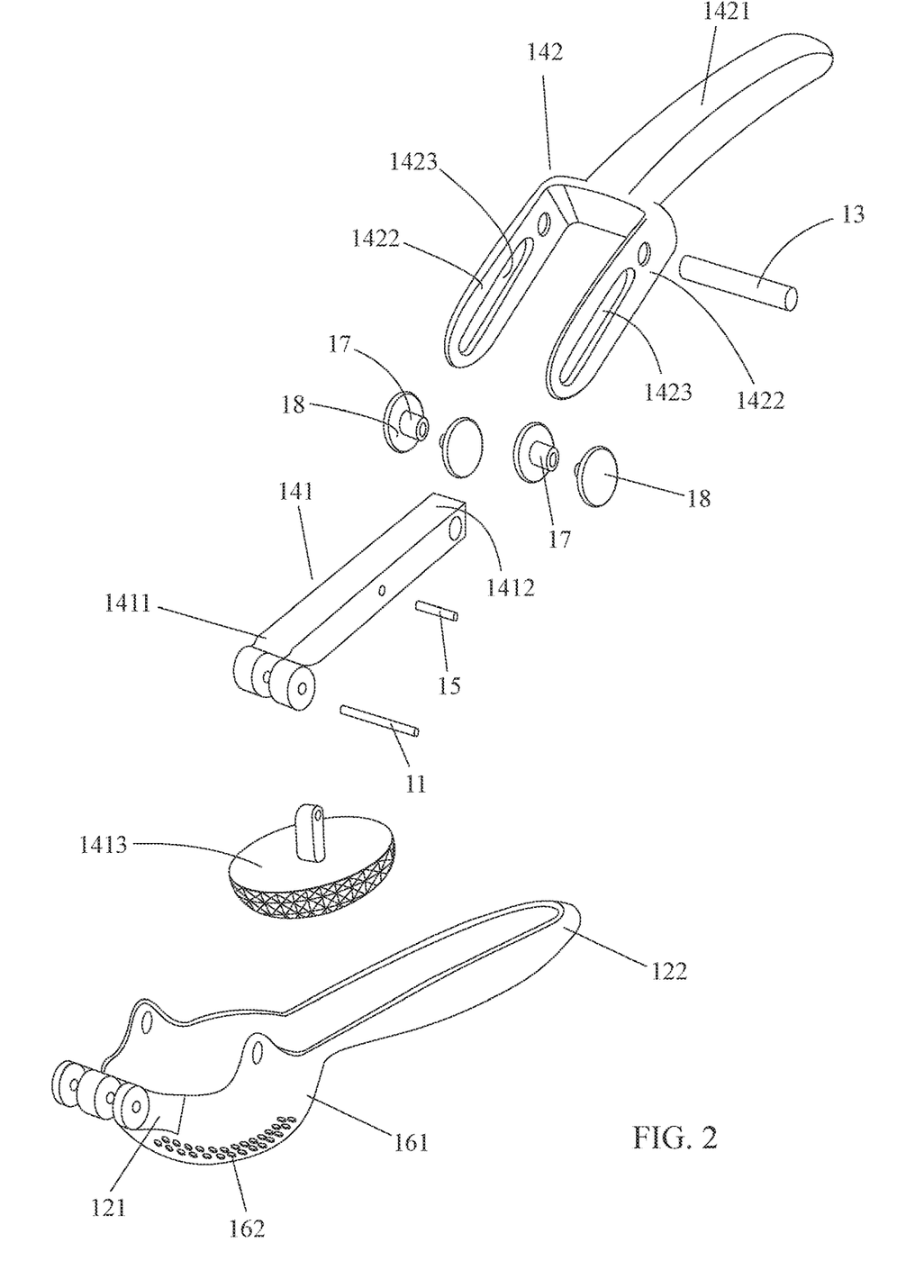
FIG. 2 is an exploded perspective view of the garlic press shown in FIG. 1.

The arm assembly 14 comprises a first arm 141 and a second arm 142. The first arm 141 comprises a proximal end portion 1411 and a distal end portion 1412. The proximal end portion 1411 is pivotally coupled to the pivot end 121 of the base plate 12 by a first pivot such as a pin 11 or a rivet, so that the first arm 141 is pivotal around the pin 11 relative to the base plate 12 between a closed position in proximity to the base plate 12 and an open position away from the base plate 12. Between the proximal end portion 1411 and the distal end portion 1412 of the first arm 141 is provided a press plate 1413 securely attached on the first arm 141 by means of a pin 15. The press plate 1413 is positioned to correspond to the squeeze chamber 16 in order to receive the press plate 1413 inside the squeeze chamber 16. The surface of the press plate 1413 is sized and shaped in correspondence to a bottom 161 of the squeeze chamber 16. When the garlic cloves or the like are placed in the squeeze chamber 16 while the first arm 141 pivots to the closed position, the garlic cloves or the like are crushed between the surface of the press plate 1413 and the bottom 161 of the squeeze chamber 16. The crushed granules and the resultant fluid are discharged from the through holes 162 formed through the bottom 161 of the squeeze chamber 16.

Figure 3A:
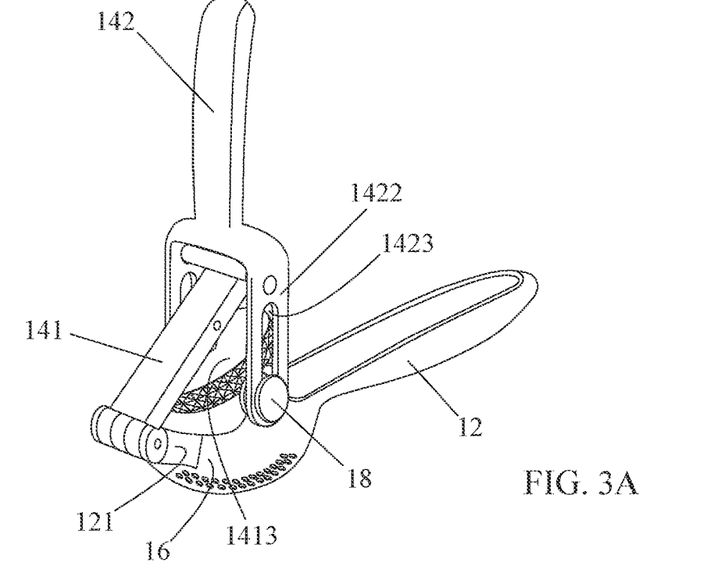
FIG. 3A to FIG. 3C are schematic views of the garlic press shown in FIG. 1 illustrating the movement of the garlic press from an open position to a closed position.
Figure 3B:
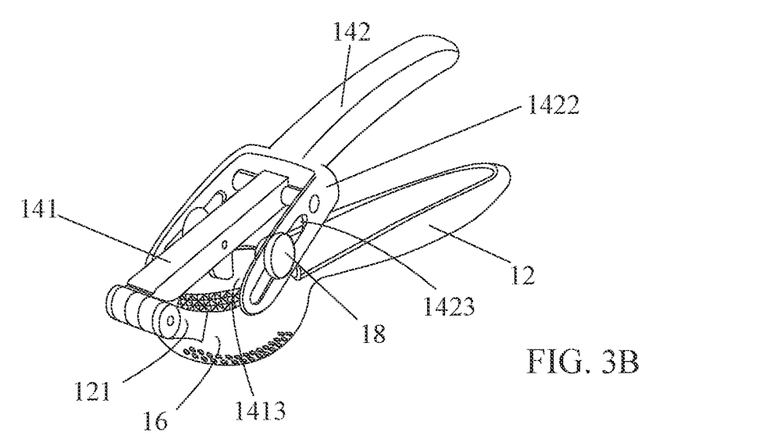

The second arm 142 is pivotally coupled to the distal end portion 1412 of the first arm 141 by, for example, a pin 13 or a rivet in such a manner that the pivotal movement of the second arm 142 is able to cause the first arm 141 to pivot around the pin 11 relative to the base plate 12. As shown in FIG. 2, the second arm 142 is of a bifurcated structure, comprising a manipulation portion 1421, two opposite bifurcated portions 1422 extending from an end of the manipulation portion, and a slot 1423 formed through each of the bifurcated portions and positioned away from the manipulation portion. In this embodiment, a second pivot 17 is provided on an upper edge of each of two opposite sides of the squeeze chamber 16, the second pivot 17 extending through the respective slot 1423 as shown in FIG. 3A to FIG. 3B. Each of both ends of the second pivot 17 has a stopper 18, and the two stoppers 18 at the two ends slidably hold the respective bifurcated portion 1422 therebetween to prevent the bifurcated portion 1422 in sliding motion from detaching from the second pivot 17. During the pivotal movement process of the second arm 142, the slot 1423 on the bifurcated portion 1422 allows for slidable movement of the respective bifurcated portion in a longitudinal direction of the slot, which slidable movement in turn causes the first arm 141 to pivot between the closed position and the open position. Therefore, the first arm 141 and the second arm 142 respectively form two levers which constitute a compound lever mechanism. When the first arm 141 is in the closed position, the press plate 1413 engages with the squeeze chamber 16 to squeeze the food items; when the first arm 141 is in the open position, the press plate 1413 disengages from the squeeze chamber 16.

Figure 3C:
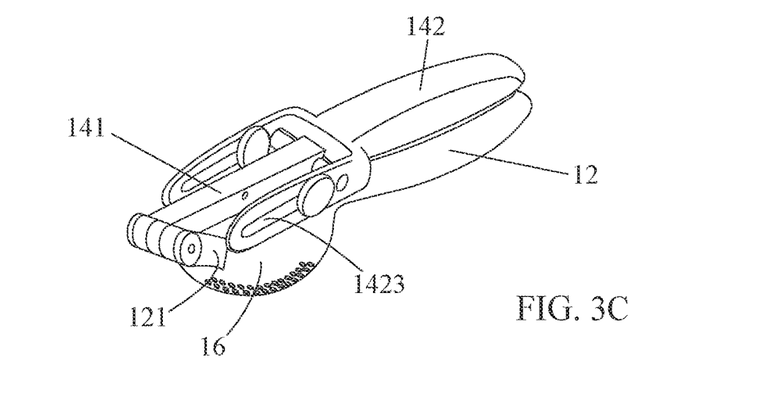

Referring now to FIG. 3A to FIG. 3C, there is illustrated the movement of the garlic press 10 from the open position to the closed position. As illustrated, the second pivot 17 actually is a sliding pivot point, the position of which in the slot 1423 is variable in a pivoting cycle of the second press portion 142. When the second arm 142 relative to the base plate 12 is set at a 90-degree angle (FIG. 3A), the sliding pivot point is at the lowest end of the slot 1423, where the sliding pivot point is spaced away from the manipulation portion 1421 at the greatest distance; when the second arm 142 relative to the base plate 12 is set at a 45-degree angle (FIG. 3B), the sliding pivot point is approximately in the middle of the slot 1423; when the second arm 142 relative to the base plate 12 is set at a 0-degree angle (FIG. 3C), the sliding pivot point is at the other end of the slot 1423, where the linear distance between the sliding pivot point and the manipulation portion 1421 is the smallest. The angle of the second arm 142 relative to the base plate 12 determines an angular size of the first arm 141 which pivots relative to the base plate 12, this is one of various factors affecting what force is transmitted to the squeezer on the arm assembly. When a force is applied by an operator onto the manipulation portion 1421 of the second arm 142, the second arm 142 would output an increasing force; the increasing output force is immediately applied to the first arm 141, and then the force transmitted from the first arm 141 to the press plate 1413 increases. With such a compound lever structure, the food items would be squeezed faster and easier.

FIG. 4 and FIG. 5A to FIG. 5C show in a schematic manner an onion chopper 20 constructed according to a second embodiment of the present invention, the onion chopper 20 having the same arm assembly structure as the first embodiment discussed above. Specifically, the onion chopper 20 comprises a base plate 22, an arm assembly 24, a cutting plate 26 and a container 28. The base plate 22 comprises a pivot end 221 and a handle end 222.

Figure 4:
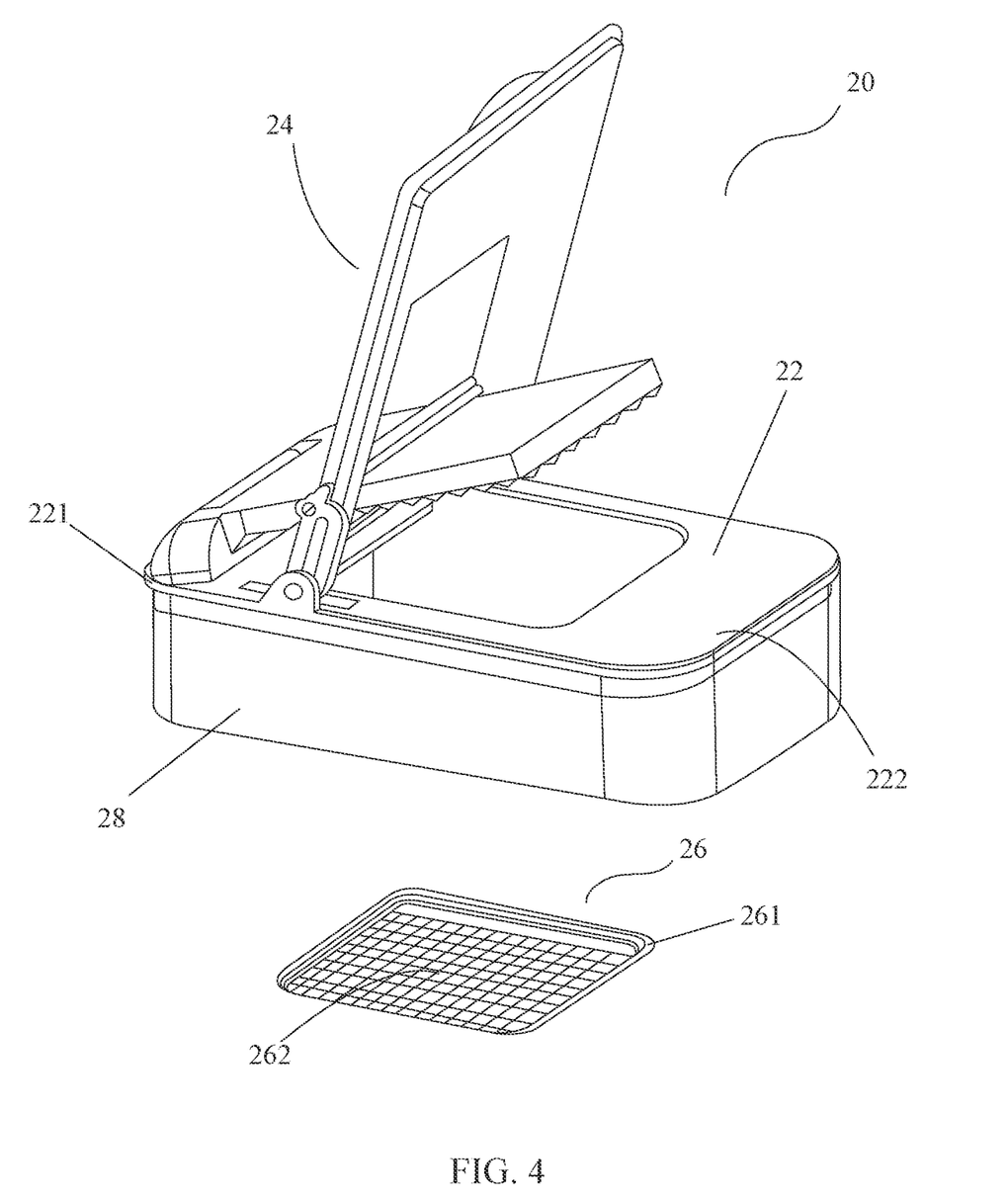
FIG. 4 is a schematic perspective view of a structure of an onion chopper constructed according to a second embodiment of the present invention.

The cutting plate 26 is detachably mounted on a top face of the base plate between the pivot end 221 and the handle end 222. The detachable arrangement of the cutting plate is provided for ease of change of different cutting plates according to the actual needs to satisfy different cutting requirements for different food items. The cutting plate 26 is shaped and sized to adapt for mounting on the base plate 22. For example, the cutting plate 26 comprises a flange 261 extending along a periphery thereof, and the flange 261 is configured such that the cutting plate 26 is safely supported on the top face of the base plate 22. The cutting plate 26 has a blade grille 262 to cut the food items. In this embodiment, the blade grille is composed of two groups of blades arranged relative to each other at a right angle, thereby forming a square grille. Alternatively, the blade grille is formed as a slit grille composed of blades parallel to each other.

The container 28 is detachably engaged with the entire periphery of a bottom face of the base plate 22 by use of a method (for example, snap-fit) known in the art for the purpose of receiving the food items that are cut and discharged from the cutting plate. As shown in FIG. 4, the container 28 and the base plate 22 have the substantially same shape. In this embodiment, the container 28 is substantially rectangular and may have a variable depth to receive a desired expected volume of onions or other food items.

An important feature of the onion chopper 20 is the arm assembly mechanism. As shown in FIG. 4 and FIG. 5A to FIG. 5C, the arm assembly 24 comprises a first arm 241 and a second arm 242. The first arm 241 comprises a proximal end portion 2411 and a distal end portion 2412. The proximal end portion 2411 is pivotally coupled to the pivot end 221 of the base plate 22 by a first pivot such as a pin or a rivet, so that the first arm 241 is pivotal relative to the base plate 22 between a closed position in proximity to the base plate 22 and an open position away from the base plate 22. A plurality of downward protrusions 2413 extend from an inner surface of the distal end portion 2412 of the first arm 241 to form a blade grille. The protrusions 2413 are ideally arranged to push an onion to be processed through the blade grille 262, and each of the protrusions 2413 is positioned to cooperate with a cell of the blade grille 262. When an onion or the like is placed on the cutting plate 26 and the first arm 241 is pivoted to be in the closed position, the protrusions 2413 would be pressed against the onion or the like which are then pressed against the blade grille 262. The onion or the like are pressed and pushed to run through the openings defined by the blades of the blade grille to allow for the cutting of the onion or the like into granules. The onion granules directly fall into the container 28.

The second arm 242 is pivotally coupled to the distal end portion 2412 of the first arm 241 in such a manner that the pivotal movement of the second arm 242 causes the first arm 241 to pivot relative to the base plate 22. Likewise, the second arm 242 comprises a manipulation portion 2421, two opposite bifurcated portions 2422 extending from an end of the manipulation portion, and a slot 2423 formed on each of the bifurcated portions and positioned away from the manipulation portion. In this embodiment, on an upper edge of each of two opposite sides of the base plate 22 is provided a second pivot 27 positioned in proximity to the cutting plate 26. The second pivot 27 extends through the respective slot 2423. During the pivotal movement process of the second arm 242, the slot 2423 on the bifurcated portion 2422 allows for slidable movement of the respective bifurcated portion in a longitudinal direction of the slot, which slidable movement in turn causes the first arm 241 to pivot between the closed position and the open position. Therefore, the first arm 241 and the second arm 242 respectively form two levers which constitute a compound lever mechanism.

Figure 5A:
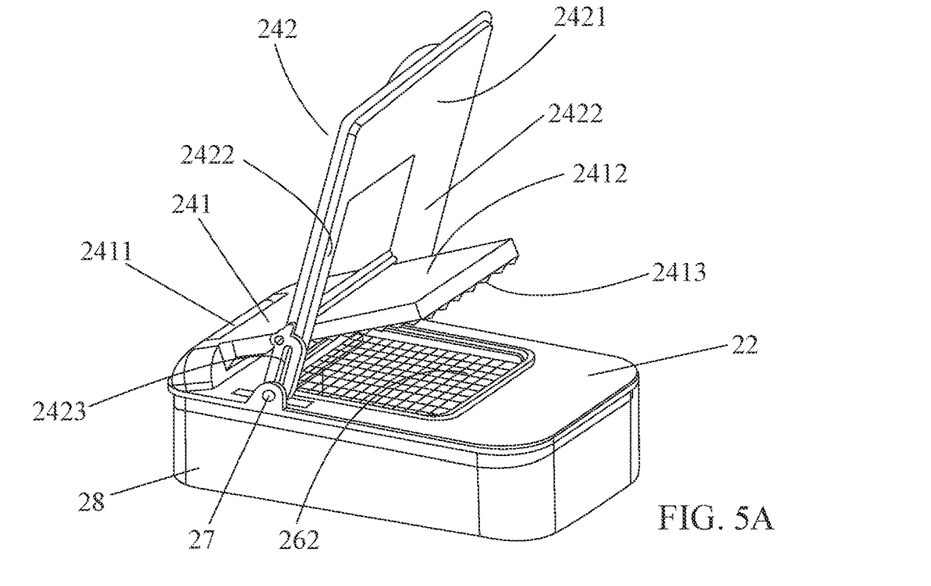
FIG. 5A to FIG. 5C are schematic views of the onion chopper shown in FIG. 4 illustrating the movement of the onion chopper from an open position to a closed position.
Figure 5B:
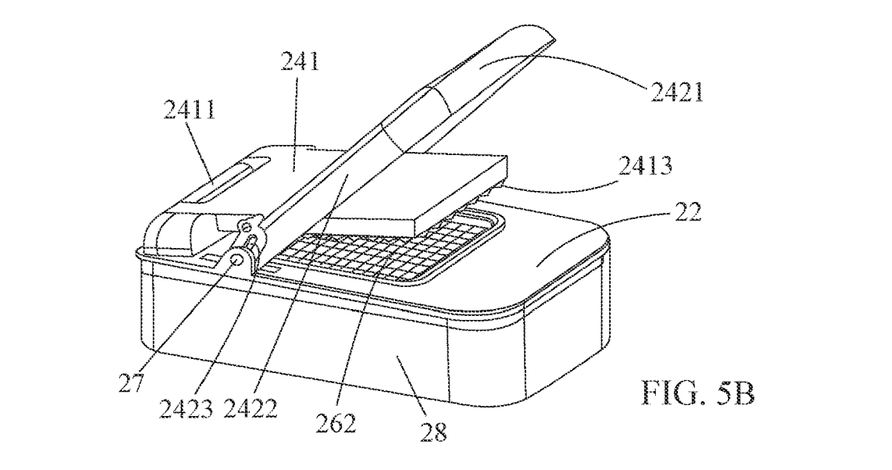
Figure 5C:
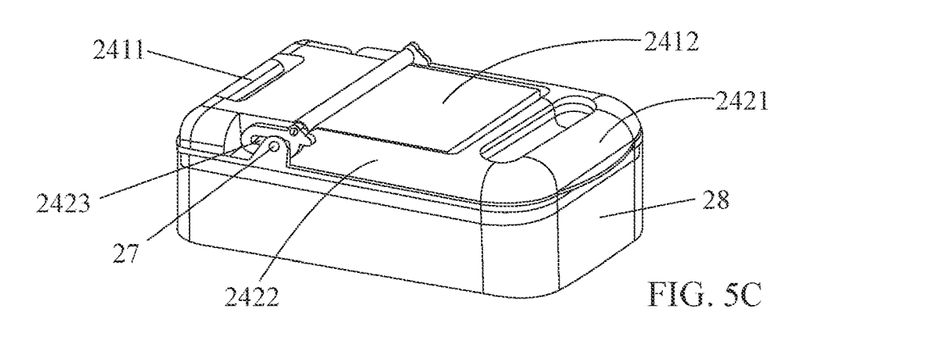

FIG. 5A to FIG. 5C show the movement of the onion chopper 20 from the open position to the closed position, which may be made reference to the description of FIG. 3A to FIG. 3C and is not elaborated herein.

Figure 6A:
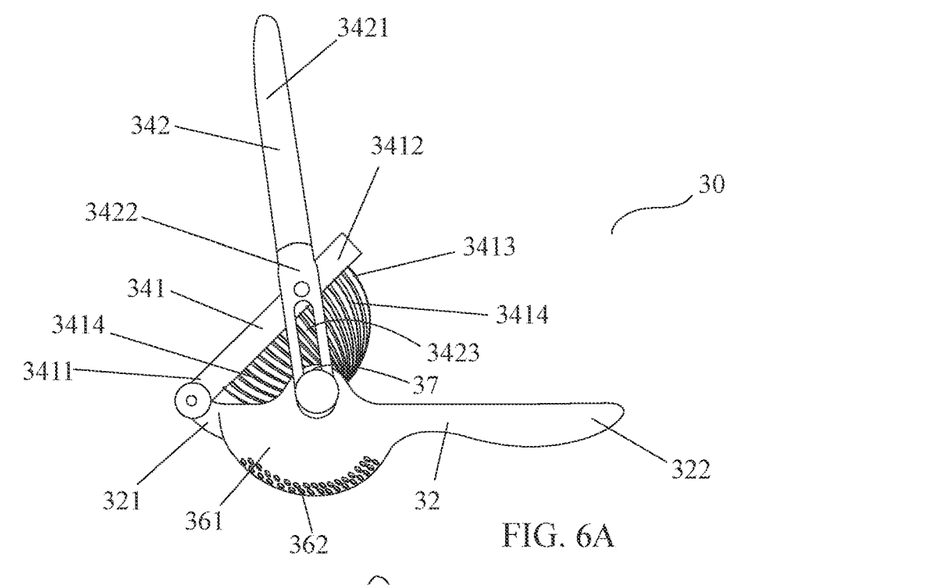
FIG. 6A to FIG. 6C are schematic views of a juice extractor constructed according to a third embodiment of the present invention and show the movement of the juice extractor from an open position to a closed position.
Figure 6B:
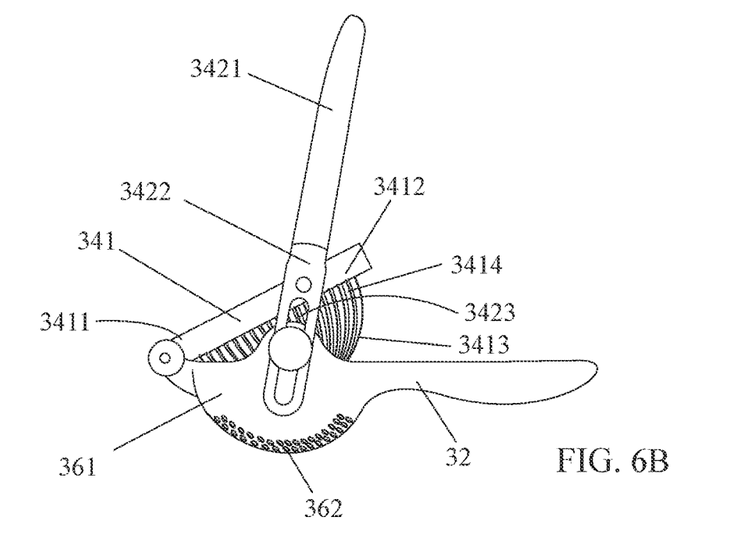
Figure 6C:
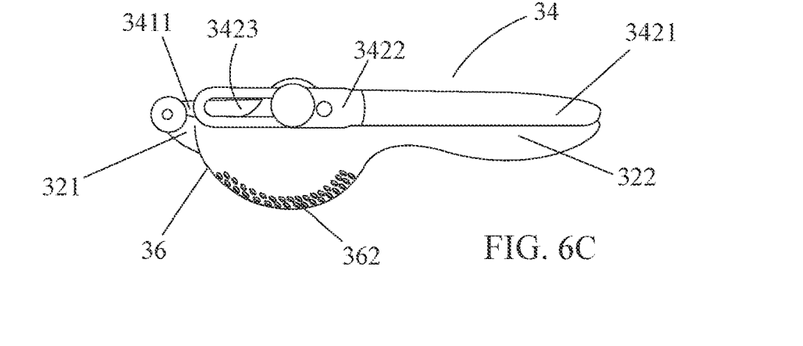

FIG. 6A to FIG. 6C show in a schematic manner the movement of a juice extractor 30 constructed according to a third embodiment of the present invention from the open position to the closed position. The juice extractor 30 has the same arm assembly structure as the first embodiment discussed above, comprising a base plate 32, an arm assembly 34 and a squeeze chamber 36. The base plate 32 comprises a pivot end 321 and a handle end 322. The squeeze chamber 36 is provided at a position in proximity to the pivot end 321 of the base plate 32, and is shaped or sized to accommodate fruits and vegetables or the like to be processed. The squeeze chamber 36 comprises a concave squeeze face 361 and a bottom having a plurality of guiding holes 362 to allow for outflow of fruit and vegetable juices. Like the second embodiment discussed above, the juice extractor 30 may comprise a container (not shown) engageable with a periphery of a bottom face of the base plate 32 for receiving the fruit and vegetable juices.

The arm assembly 34 comprises a first arm 341 and a second arm 342. The first arm 341 comprises a proximal end portion 3411 and a distal end portion 3412. The proximal end portion 3411 is pivotally coupled to the pivot end 321 of the base plate 32 by a first pivot such as a pin or a rivet, so that the first arm 341 is pivotal around the first pivot relative to the base plate 32 between a closed position in proximity to the base plate 32 and an open position away from the base plate 32. Beneath the first arm 341 is provided a convex squeeze face 3413 on which a plurality of teeth 3414 are machined. The convex squeeze face 3413 cooperates with the concave squeeze face 361 to achieve a juice extraction. When the fruits or vegetables or the like are placed in the squeeze chamber 36 and the first arm 341 is in the closed position, the fruits or vegetables or the like are squeezed between the convex squeeze face 3413 having the plurality of teeth 3414 and the concave squeeze face 361, and the fruit or vegetable juice is discharged through the guiding holes 362.

The second arm 342 and the distal end portion 3412 of the first arm 341 are pivotally coupled to each other, in such a manner that the pivotal movement of the second arm 342 is able to cause the first arm 341 to pivot relative to the base plate 32. Likewise, the second arm 342 comprises a manipulation portion 3421, two opposite bifurcated portions 3422 extending from an end of the manipulation portion 3421, and a slot 3423 formed on each of the bifurcated portions and positioned away from the manipulation portion. In this embodiment, on an upper edge of each of two opposite sides of the squeeze chamber 36 is provided a second pivot 37. The second pivot 37 extends through the respective slot 3423. During the pivotal movement process of the second arm 342, the slot 3423 on the bifurcated portion 3422 allows for slidable movement of the respective bifurcated portion in a longitudinal direction of the slot, which slidable movement in turn causes the first arm 341 to pivot between the closed position and the open position. Therefore, the first arm 341 and the second arm 342 respectively form two levers which constitute a compound lever mechanism.

FIG. 6A to FIG. 6C show the movement of the juice extractor 30 from the open position to the closed position, which may be made reference to the description of FIG. 3A to FIG. 3C and is not elaborated herein.

FIGS. 7-9 and FIG. 10A to FIG. 10C show in a schematic manner a garlic press 40 constructed according to a fourth embodiment of the present invention. This garlic press 40 is a variation of the garlic press 10 discussed in the above first embodiment and has a similar arm assembly structure. Specifically, the garlic press 40 comprises a base plate 42, an arm assembly 44 and a squeeze chamber 46. The base plate 42 comprises a pivot end 421 and a handle end 422. The squeeze chamber 46 is provided at a position in proximity to the pivot end 421 of the base plate 42, and is shaped or sized to accommodate garlic cloves or the like to be processed. The squeeze chamber 46 in this embodiment has a substantially rectangular cross-section and has a bottom provided with a plurality of through holes allowing for outflow of garlic granules and a fluid.

Figure 7:
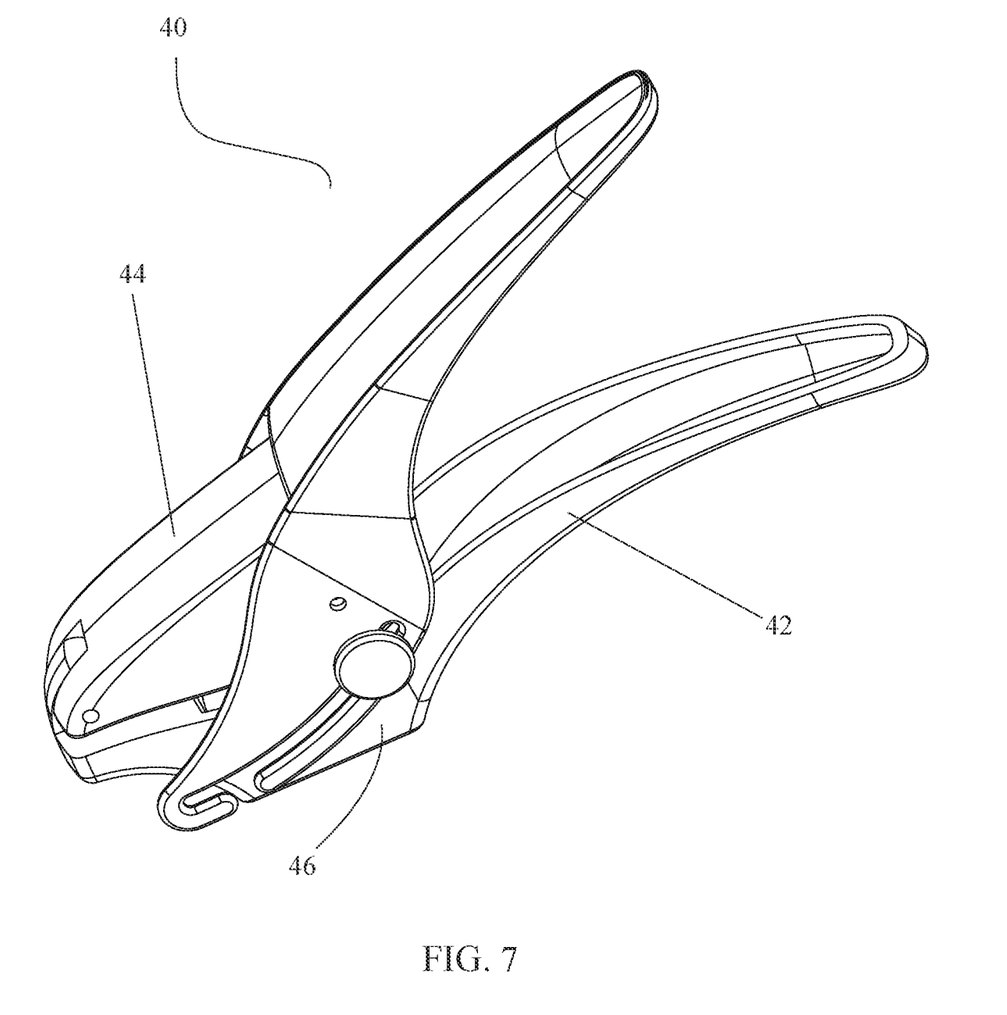
FIG. 7 is a schematic perspective view of a structure of a garlic press constructed according to a fourth embodiment of the present invention.
Figure 8:
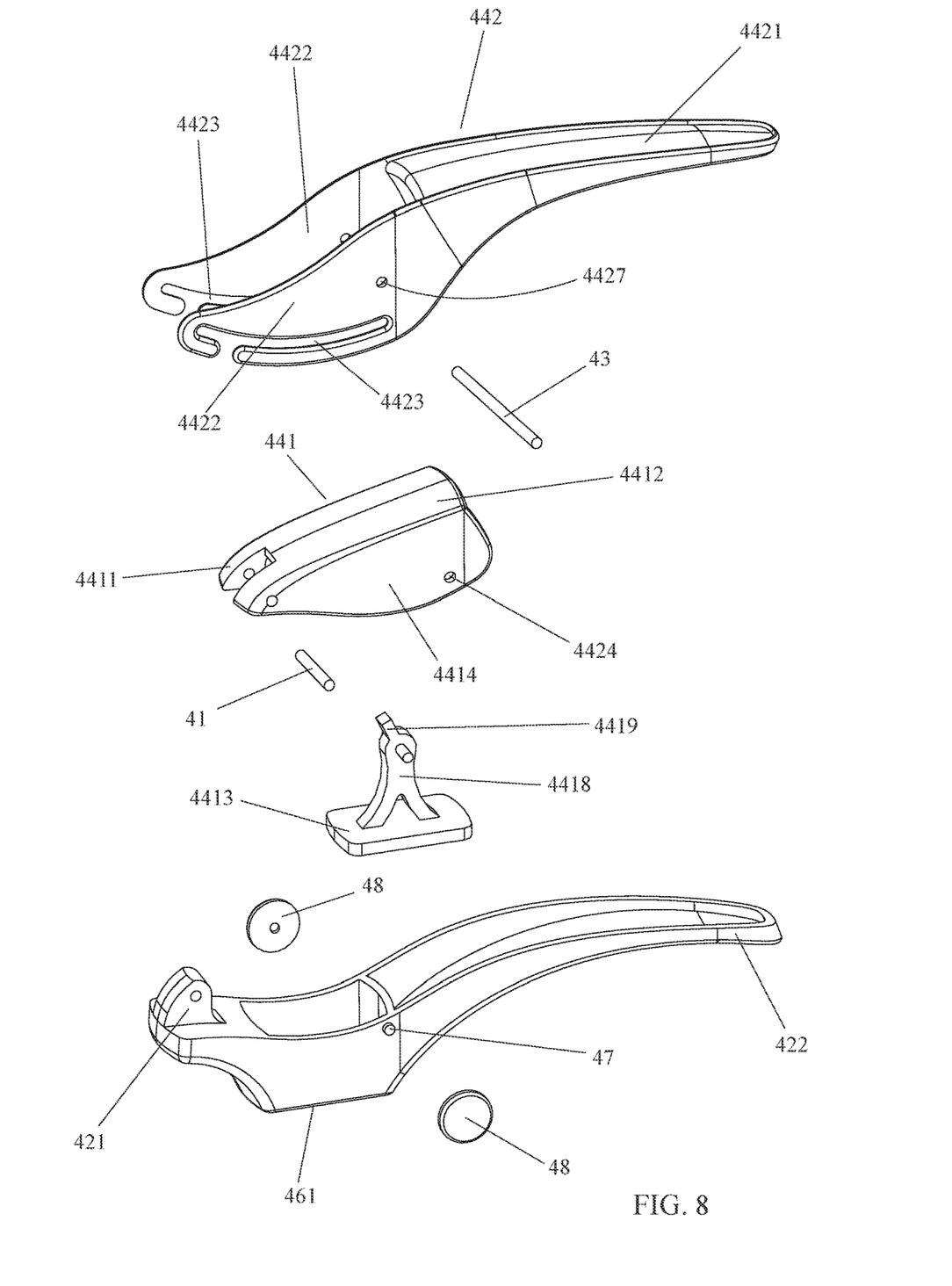
FIG. 8 is an exploded perspective view of the garlic press shown in FIG. 7.
Figure 9:
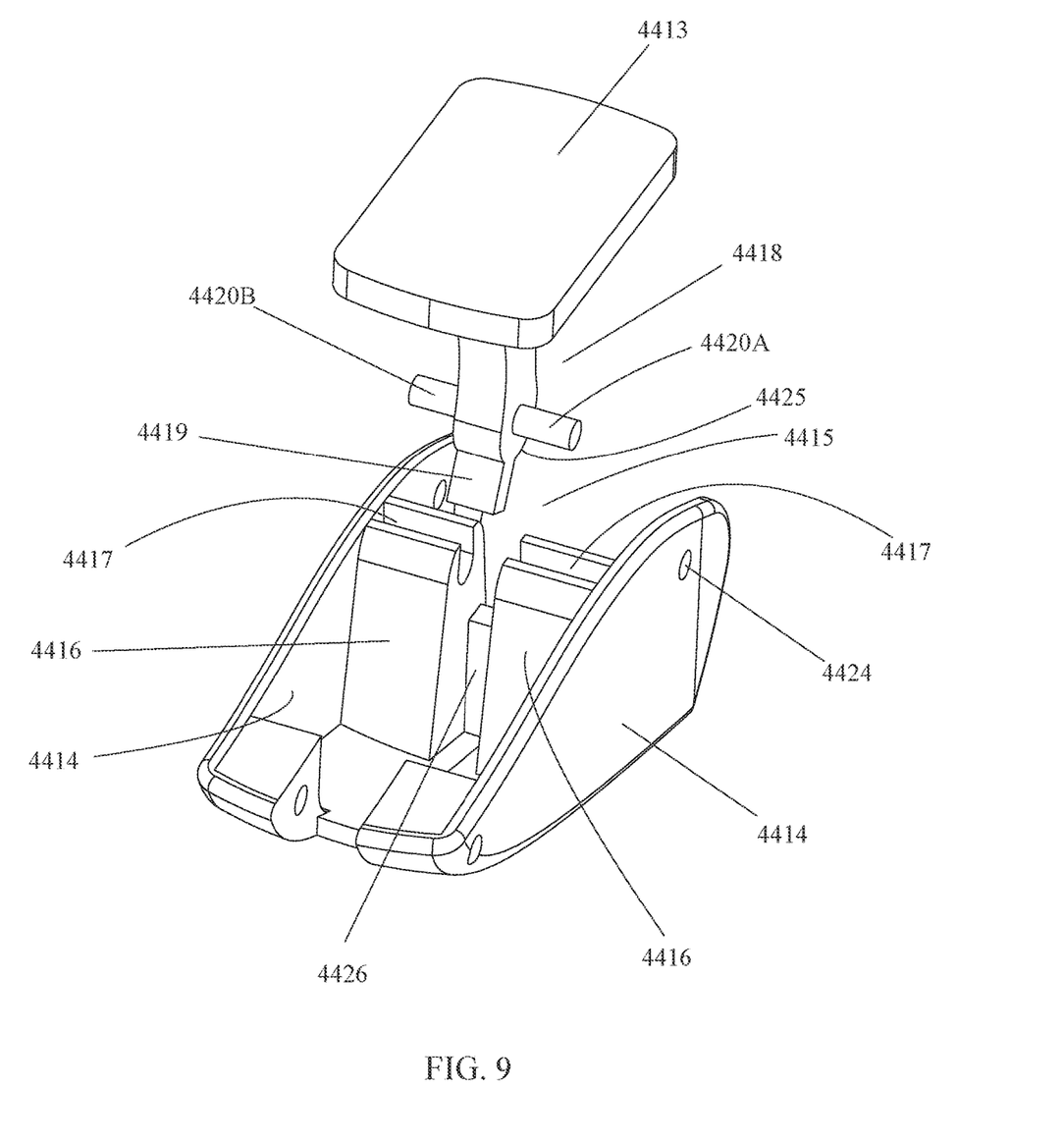
FIG. 9 is a bottom perspective view of the first arm and the press plate shown in FIG. 7.

The arm assembly 44 comprises a first arm 441 and a second arm 442. The first arm 441 comprises a proximal end portion 4411 and a distal end portion 4412. The proximal end portion 4411 is pivotally coupled to the pivot end 421 of the base plate 42 by a first pivot such as a pin 41 or a rivet, so that the first arm 441 is pivotal around the pin 41 relative to the base plate 42 between a closed position in proximity to the base plate 42 and an open position away from the base plate 42. A tab 4414 extends from each of two opposite sides of the first arm 441 to define a channel 4415 in which two downwardly facing projections 4416 extend from a bottom surface of the first arm 441 with a gap therebetween. Each of the projections 4416 has a depression 4417 at a bottom thereof.

A press plate 4413 is pivotally attached on the first arm 141 by a connector 4418 which extends from the press plate 4413. As clearly illustrated in FIG. 9, the connector 4418 comprises a top portion 4419, and a first lateral portion 4420A and a second lateral portion 4420B extending opposite one to another with respect to said top portion 4419. The first and second lateral portions 4420A and 4420B of the press plate 4413 are pivotally received in the respective depressions 4417 formed at the bottom of the projections. The top portion 4419 of the press plate 4413 has a cam face 4425 which rotatably abuts against a stand 4426 arranged in the gap between the two projections 4416. The stand 4426 extends from the bottom surface of the first arm 441. The cam face 4425 abuts against the stand 4426 in a manner that the press plate 4413 is allowed for pivotal movement. The stand 4426 is mounted to serve as a stopper for prevention of a further rotatable movement of the top portion 4419 across the stand. Such a connection of the press plate 4413 with the first arm 441 provides the flexibility to permit the movement of the press plate 4413 while still maintaining an efficient crush of garlic cloves.

The press plate 4413 is of substantially rectangular configuration and is positioned to correspond to the squeeze chamber 46 in order to receive the press plate 4413 inside the squeeze chamber 46. The surface of the press plate 4413 is sized and shaped in correspondence to a bottom 461 of the squeeze chamber 46. When the garlic cloves or the like are placed in the squeeze chamber 46 while the first arm 441 pivots to the closed position, the garlic cloves or the like are crushed between the surface of the press plate 4413 and the bottom 461 of the squeeze chamber 46. The crushed granules and the resultant fluid are discharged from the through holes 462 formed through the bottom 461 of the squeeze chamber 46.

Figures 10A, 10B, 10C:
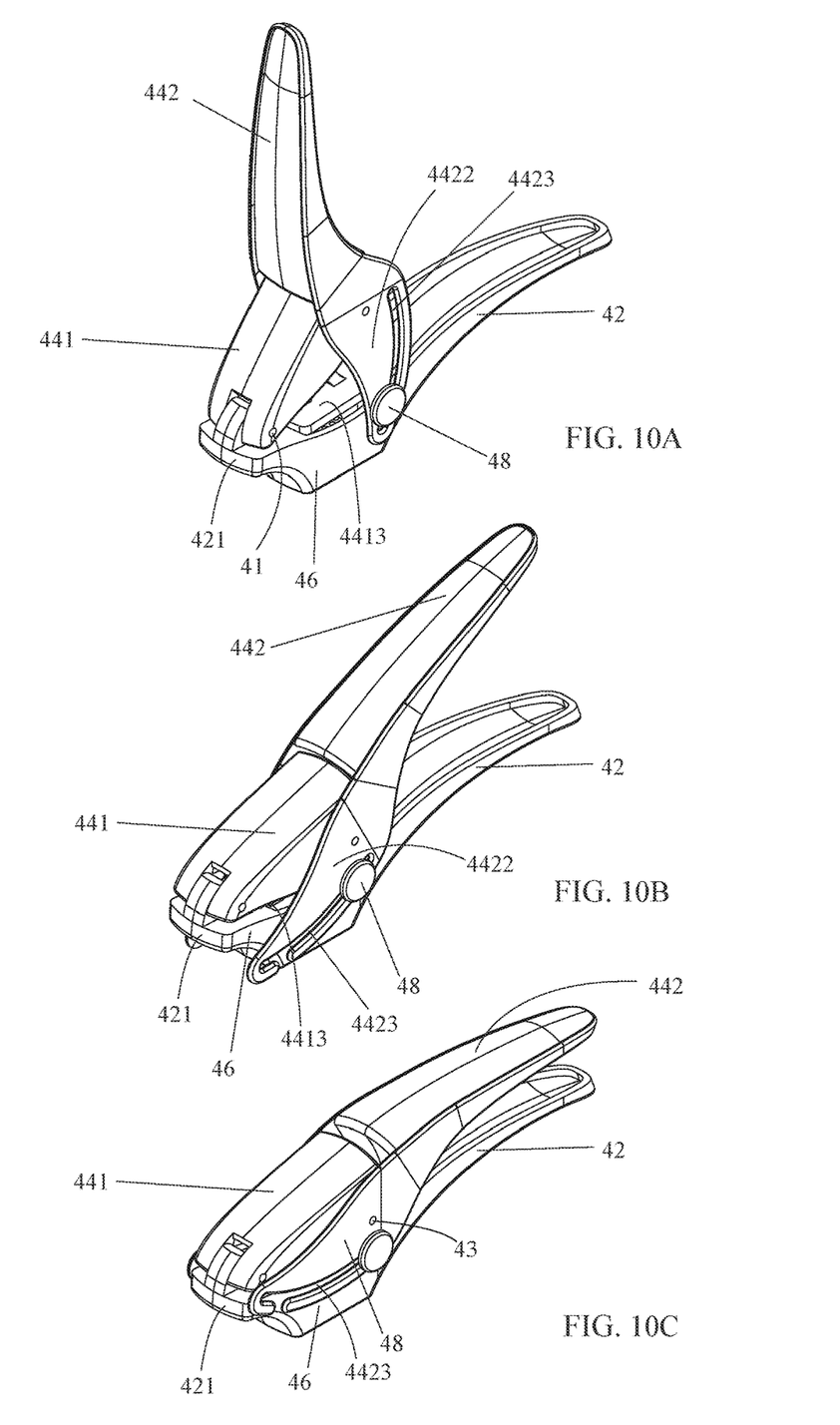
FIG. 10A to FIG. 10C are schematic views of the garlic press shown in FIG. 7 illustrating the movement of the garlic press from an open position to a closed position.

The second arm 442 is pivotally coupled to the distal end portion 4412 of the first arm 441 by, for example, a pin 43 or a rivet in such a manner that the pivotal movement of the second arm 442 around the pin 43 is able to cause the first arm 441 to pivot around the pin 41 relative to the base plate 42. As shown in FIG. 8, the second arm 442 comprises a manipulation portion 4421, two opposite panels 4422 extending from an end of the manipulation portion, and a slot 4423 formed through each of the two panels and positioned away from the manipulation portion. An aperture 4424 is formed through the tab 4414 in the vicinity of the distal end portion 4412 of the first arm, and an aperture 4427 is formed through the panel 4422. The pin pivotally passes through the aperture 4424 of the tab 4414 and the aperture 4427 of the panels 4422 for pivotally coupling the second arm 442 to the first arm 441. In this embodiment, a second pivot 47 projects outwardly from an upper edge of each of two opposite sides of the squeeze chamber 46 to extend through the respective slot 4423 as shown in FIG. 10A to FIG. 10B. The second pivot 47 is terminated by a stopper 48, thereby holding the respective panel 4422 to prevent the panel 4422 in sliding motion from detaching from the second pivot 47. During the pivotal movement process of the second arm 442, the slot 4423 formed through the panel 1422 is longitudinal and allows for slidable movement of the respective panel 4422 in a longitudinal direction of the slot, which slidable movement in turn causes the first arm 441 to pivot around the pin 41 between the closed position and the open position. Therefore, the first arm 441 and the second arm 442 respectively form two levers which constitute a compound lever mechanism. When the first arm 441 is in the closed position, the press plate 4413 engages with the squeeze chamber 46 to squeeze the food items; when the first arm 441 is in the open position, the press plate 4413 disengages from the squeeze chamber 46.

FIG. 10A to FIG. 10C show the movement of the garlic press 40 from the open position to the closed position, which may be made reference to the description of FIG. 3A to FIG. 3C and is not elaborated herein.

Having sufficiently described the nature, major features and advantages of the present invention according to some preferred embodiments, the invention, however, should not be limited to the structures and functions of the embodiments and drawings. It is stated that insofar as its basic principle is not altered, changed or modified it may be subjected to variations of detail. Numerous variations and modifications that are easily obtainable by means of the skilled person's common knowledge without departing from the scope of the invention should fall into the scope of this invention.

What is claimed is:

1. A food processing device comprising:
a base plate comprising a first pivot and a second pivot that are in spaced apart fashion along a length direction of the base plate;
a processing element arranged on the base plate in a length direction of the base plate for processing food items; and
an arm assembly pivotably coupled to the base plate;
characterized in that the arm assembly comprises a first arm and a second arm which are configured to form a compound lever mechanism, and the first arm and the second arm are mounted above a plane where a top surface of the base plate is lying;
wherein the first arm comprises a proximal end portion and a distal end portion, the proximal end portion configured to be pivotally coupled to the base plate by the first pivot and drive the first arm to pivot between a closed position in proximity to the base plate and an open position away from the base plate; wherein the first arm further comprises a squeezer configured to act on the food items that are placed on the processing element to be processed when the first arm is in the closed position, thereby pressing the food items against the processing element; and
wherein the second arm is pivotally coupled to the distal end portion of the first arm, the second arm comprising a manipulation portion, two opposite bifurcated portions extending from the manipulation portion, and a slot formed through each of the bifurcated portions; wherein the second pivot of the base plate is arranged to pass through the slots on the two bifurcated portions in such a way that the two bifurcated portions are slidable within the slots in a longitudinal direction of the slots, and the slidable movement of the two bifurcated portions of the second arm in turn causes the first arm to pivot between the closed position and the open position, thereby the first and second arms together form the compound lever mechanism, throughout a pivotal movement process of the second arm about the second pivot relative to the base plate.

2. The food processing device of claim 1, wherein a distance between the second pivot and the manipulation portion increases along with the pivotal movement of the second arm from a position in proximity to the base plate to a position away from the base plate.

3. The food processing device of claim 1, wherein the second pivot is configured to comprise two pivot branches each arranged on a lateral side of the base plate and extending through the respective slot.

4. The food processing device of claim 1, wherein the second arm is configured to pivot relative to the base plate by an angle of at least 90 degrees.

5. The food processing device of claim 1, wherein the slots formed on the respective bifurcated portions are positioned to be away from the manipulation portion.

6. The food processing device of claim 1, wherein the food processing device is provided as a garlic press in which the processing element is configured to be a squeeze chamber for accommodating garlic cloves, and the squeezer is positioned and configured as a press plate engageable with the squeeze chamber.

7. The food processing device of claim 6, wherein the squeeze chamber has a bottom provided with a plurality of through holes allowing for outflow of garlic granules and a fluid, or with a plurality of blades arranged in parallel for slicing the garlic cloves.

8. The food processing device of claim 1, wherein the food processing device is provided as a food cutting device in which the processing element is configured to be a cutting plate having a plurality of blades and fixed on a top face of the base plate, and the squeezer is configured as a plurality of protrusions extending from the first arm and positioned to cooperate with the plurality of blades on the cutting plate to cut the food items.

9. The food processing device of claim 8, wherein the plurality of blades on the cutting plate are arranged to form a blade grille.

10. The food processing device of claim 8, wherein the cutting plate is detachably mounted on the base plate.

11. The food processing device of claim 8, wherein the food cutting device further comprises a container detachably engageable with a periphery of a bottom face of the base plate for receiving the food items discharged from the cutting plate.

12. The food processing device of claim 8, wherein the food cutting device is selected from a group consisting of an onion chopper, an onion slitter, a mushroom chopper, a mushroom slitter and a potato slitter.

13. The food processing device of claim 1, wherein the food processing device is provided as a juice extractor in which the processing element is configured to be a squeeze chamber for accommodating fruits and vegetables and to comprise a concave squeeze face allowing for outflow of a fluid, and the squeezer is configured to be a convex squeeze face having a plurality of teeth and positioned to cooperate with the concave squeeze face for juice extraction.

14. The food processing device of claim 13, wherein the concave squeeze face has a plurality of guiding holes allowing for the outflow of the fluid.

15. The food processing device of claim 13, wherein the juice extractor further comprises a container detachably engageable with a periphery of a bottom face of the base plate for receiving juice of the fruits and vegetables.

16. The food processing device of claim 6, wherein a connector extends from the press plate; and a tab extends from each of two opposite sides of the first arm to define a channel in which two downwardly facing projections extend from a bottom surface of the first arm for pivotal receiving the connector.

17. The food processing device of claim 16, wherein the connector comprises a top portion having a cam face which rotatably abuts against a stand arranged between the two projections in a manner that the stand prevents the top portion from a further rotatable movement across the stand.

18. The food processing device of claim 17, wherein the connector comprises a first lateral portion and a second lateral portion extending opposite one to another with respect to the top portion; and each of the projections has a depression at a bottom thereof for pivotally receiving the first and second lateral portions, respectively.

* * * * *